US012606876B2

(12) United States Patent
Lin et al.

(10) Patent No.: US 12,606,876 B2
(45) Date of Patent: Apr. 21, 2026

(54) PREPARATION METHOD OF PLANT BIOMASS-BASED ACTIVE TANNING AGENT

(71) Applicant: SICHUAN UNIVERSITY, Chengdu (CN)

(72) Inventors: Wei Lin, Chengdu (CN); Yuanhang Xiao, Chengdu (CN); Chunhua Wang, Chengdu (CN); Min Jiang, Chengdu (CN)

(73) Assignee: Sichuan University (CN)

( * ) Notice: Subject to any disclaimer, the term of this patent is extended or adjusted under 35 U.S.C. 154(b) by 171 days.

(21) Appl. No.: 17/919,176

(22) PCT Filed: Jun. 1, 2022

(86) PCT No.: PCT/CN2022/096522

§ 371 (c)(1),
(2) Date: Oct. 14, 2022

(87) PCT Pub. No.: WO2022/253254

PCT Pub. Date: Dec. 8, 2022

(65) Prior Publication Data

US 2024/0247326 A1 Jul. 25, 2024

(30) Foreign Application Priority Data

Jun. 3, 2021 (CN) ........................ 202110621604.8

(51) Int. Cl.
*C14C 3/12* (2006.01)

(52) U.S. Cl.
CPC .................................... *C14C 3/12* (2013.01)

(58) Field of Classification Search
CPC ...................................................... C14C 3/12
USPC .......................................................... 8/94.32
See application file for complete search history.

(56) References Cited

FOREIGN PATENT DOCUMENTS

| | | | | | |
|---|---|---|---|---|---|
| CN | 101781689 | A | * | 7/2010 | C14C 3/08 |
| CN | 108085434 | A | * | 5/2018 | C14C 3/08 |
| CN | 108892649 | A | * | 11/2018 | C07D 251/44 |
| CN | 109575811 | A | * | 4/2019 | C09F 1/04 |

OTHER PUBLICATIONS

Joh et al. Solid-state fermentation for L-lactic acid production from agro wastes using Lactobacillus delbrueckii. Process Biochemistry 41 (2006) p. 759-763.*

* cited by examiner

*Primary Examiner* — Amina S Khan
(74) *Attorney, Agent, or Firm* — C. Tumey Law Group PLLC

(57) ABSTRACT

Disclosed is a preparation method of a plant biomass-based active tanning agent. Under a low-temperature reaction condition, cyanuric chloride and a plant biomass compound are used to synthesize an environment-friendly plant biomass-based active tanning agent through a nucleophilic substitution reaction. The active tanning agent obtained in the present disclosure appears as a white or light brown emulsion at room temperature, and has substantial active groups such as hydroxyl groups, carboxyl groups and ester groups introduced into its structure, thus endowing leathers with desirable hydrothermal stability and physical properties and having a desirable synergistic effect with metal tanning agents. Meanwhile, health and environment risks caused by hexavalent chromium and free formaldehyde in leathers are avoided.

4 Claims, 1 Drawing Sheet

PREPARATION METHOD OF PLANT BIOMASS-BASED ACTIVE TANNING AGENT

CROSS REFERENCE TO RELATED APPLICATIONS

This Application is a 371 national stage entry of PCT/CN2022/096522 filed Jun. 1, 2022, titled "PREPARATION METHOD OF PLANT BIOMASS-BASED ACTIVE TANNING AGENT", which claims the benefit and priority of Chinese Patent Application No. 202110621604.8, filed on Jun. 3, 2021, and entitled "PREPARATION METHOD OF PLANT BIOMASS-BASED ACTIVE TANNING AGENT", the disclosures of which are incorporated by reference herein in its entirety as part of the present application.

TECHNICAL FIELD

The present disclosure belongs to the technical field of material synthesis for clean leathermaking and relates to a preparation method of plant biomass-based active tanning agent.

BACKGROUND ART

Tanning is a process of turning raw hides into leathers with tanning agents and is a critical procedure during leather making. Due to the desirable comprehensive performances of chrome-tanned leathers, the chrome tannage has always been dominating the leather tanning processes. However, the Cr(III) salts used in chrome-tanned leathers are easily oxidized into Cr(VI) under certain conditions, which renders chrome tannage facing the difficulties and challenges such as the potential environment and health risks of Cr(VI) and the environmental pressures of tannery waste disposal. With the increasing attention to environmental protection and consumer health worldwide, regulations and policies around the world have become increasingly strict in limiting Cr(VI) in leather products. Especially, in "*Registration, Evaluation, Authorization and Restriction of Chemicals*" (abbreviated as REACH) as amended by the European Commission in 2014, Cr(VI) content of leather products within the European Union (EU) is limited to 3 mg/kg. Therefore, it is crucial to develop environmentally friendly chrome-free tanning chemicals and supporting technologies thereof for the clean production and sustainable development of leather making.

In the process of developing chrome-free tanning agents and supporting technologies thereof, the development and application of organic tanning agents has always been an indispensable and important part of tanning industry. At present, there are mainly vegetable tanning agents, aldehyde tanning agents, synthetic tanning agents and resin tanning agents, etc. However, these tanning agents, as being used for solo tanning, cannot meet requirements on both ecology and performances of leather products. Among them, the use of aldehyde and resin tanning agents may generate the risk of free formaldehyde. Formaldehyde has an irritating effect on respiratory mucosa, and inhalation of more formaldehyde leads to pulmonary suppuration and pulmonary edema and irritates skin to cause burns. Currently, China, Germany, France, Netherlands, Japan, and other countries as well as the European Union, the International OEKO-TEX Association and other organizations have all explicitly stipulated the limitations to formaldehyde in leathers, ranging from 20 mg/kg to 1,500 mg/kg, respectively. Moreover, synthetic tanning agents and acrylic tanning agents contain nonrenewable petroleum cracking products in raw materials for preparation, which may cause environment pollution and carbon emission problems. Therefore, in recent years, the development of environment-friendly plant biomass-based active tanning agents and their tannages has become a research focus of chrome-free tanning.

SUMMARY

The present disclosure provides a method for preparing a plant biomass-based active tanning agent. In order to achieve the objective above, the present disclosure is implemented according to the following technical solutions. The method comprises specific steps as follows:

- weighing accurately a predetermined amount of cyanuric chloride into a reaction flask charged with distilled water, adding dropwise an appropriate amount of an emulsifier and stirring evenly under a low-temperature reaction condition; adding dropwise an aqueous plant biomass compound solution, where a molar ratio of cyanuric chloride to the plant biomass compound in the aqueous plant biomass compound solution is within a range of (1.0-3.0):1; simultaneously, adding dropwise an alkali solution to control a reaction pH to be within a range of 4.0-8.0; conducting a reaction for 4.0-8.0 h under stirring; subsequently, leaving reactants to stand overnight at a low temperature to obtain a white or light brown emulsion, namely the plant biomass-based active tanning agent.

In some embodiments, the emulsifier is one or a mixture of at least two selected from the group consisting of OP-10 (polyoxyethylene octylphenol ether), Tween-80 (polyoxyethylenesorbitan monooleate), Span-80 (sorbitan fatty acid ester) and AEO-7 (fatty alcohol polyoxyethylene ether).

In some embodiments, the plant biomass compound is one selected from the group consisting of gallic acid, ellagic acid, valonic acid, catechin, procyanidine and tannic acid.

In some embodiments, the low-temperature reaction condition is one selected from the group consisting of low-temperature mechanical stirring, low-temperature ultrasonic treatment and low-temperature microwave irradiation.

In some embodiments, a temperature for the low-temperature reaction condition is 0° C., 3° C. or 5° C.

In some embodiments, carboxyl groups, hydroxyl groups and the like are introduced into a molecular structure of the plant biomass-based active tanning agent, promoting coordination crosslinking between collagen and a non-chrome metal ion to produce a desirable synergistic tanning effect.

The present disclosure further provides a plant biomass-based active tanning agent prepared by the method according to the above technical solutions.

In the present disclosure, a plant biomass compound is used as a reaction matrix, and the special structure and reactivity of cyanuric chloride is utilized for a nucleophilic substitution reaction to prepare an environment-friendly active tanning agent, where cyanuric chloride acts as a reaction substrate, and the emulsifier may improve the dispersion of cyanuric chloride in water. Moreover, the plant biomass-based active tanning agent as prepared may endow leathers with desirable hydrothermal stability and physical properties, being conducive to the clean production and sustainable development of leather making. The method for preparing a plant biomass-based active tanning agent provided in the present disclosure has the following advantages:

1) In the present disclosure, the plant biomass compound is used as a raw material for preparing active tanning agents, which belongs to a natural product, has a wide range of sources, and is safe, environment-friendly, non-toxic, and economical, being in line with the development strategy of leather making for clean production and sustainable development.

2) Active chlorine as introduced into the molecular structure of the plant biomass-based active tanning agent prepared may bind to the amino groups of collagen by covalent bonding, which shows a higher reactivity than the hydrogen bonding interaction between phenolic hydroxyl groups of a vegetable tanning agent and the collagen; moreover, the active groups such as carboxyl groups and hydroxyl groups contained may not only endow resultant leathers with desirable hydrothermal stability, but also promote binding between a non-chrome metal tanning agent and collagen to produce a desirable synergistic tanning effect.

3) The plant biomass-based active tanning agent as prepared is based on a matrix of plant biomass compounds with different molecular weight, and this makes its molecular weight in a multi-grade gradient corresponding to the hierarchical structure of collagen, such that the active tanning agent reaches an equilibrium point in terms of penetration and binding in the collagen structure.

DETAILED DESCRIPTION OF THE EMBODIMENTS

Example 1

0.1 mol of cyanuric chloride was weighed accurately into a reaction flask charged with an appropriate amount of distilled water, an appropriate amount of an emulsifier was added dropwise, and a reaction temperature was controlled at 3° C.; a 0.1 mol alkaline solution of gallic acid was added dropwise, an alkali solution was added dropwise simultaneously to control a reaction pH of 6.5, and then a reaction was conducted for 6.0 h under mechanical stirring; the reactants were left to stand overnight at a low temperature to obtain a white emulsion, namely a plant biomass-based active tanning agent.

Figure 1:
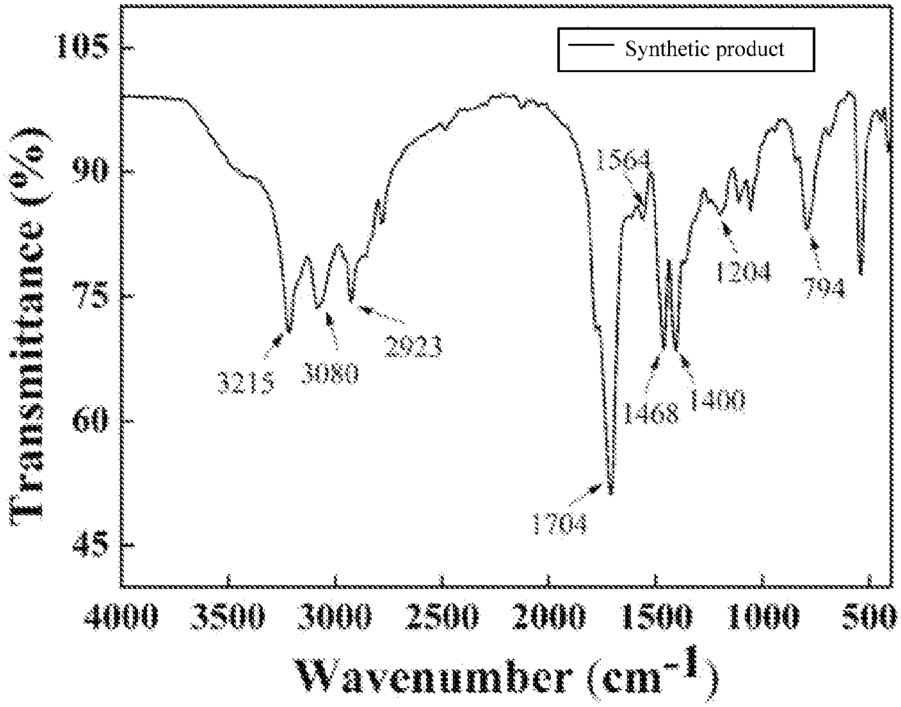
FIG. 1 shows an infrared absorption spectrum analysis graph of a plant biomass-based active tanning agent in Example 1, where a plant biomass used is gallic acid.

FIG. 1 shows an infrared absorption spectrum analysis graph of the plant biomass-based active tanning agent in Example 1. It is seen from FIG. 1 that the stretching vibration absorption peak of C—Cl is represented at 794 $cm^{-1}$, the stretching vibration absorption peaks of triazine ring or benzene ring are represented at 1400 $cm^{-1}$, 1468 $cm^{-1}$ and 1564 $cm^{-1}$, the stretching vibration absorption peak of C═O in carboxyl structure is represented at 1704 $cm^{-1}$, the stretching vibration absorption peaks of —OH are represented at 2923-3215 $cm^{-1}$, and the absorption peak of C—O—C(ether bond) also appears at 1204 $cm^{-1}$, indicating a successful nucleophilic substitution reaction of gallic acid with cyanuric chloride.

Figure 2:
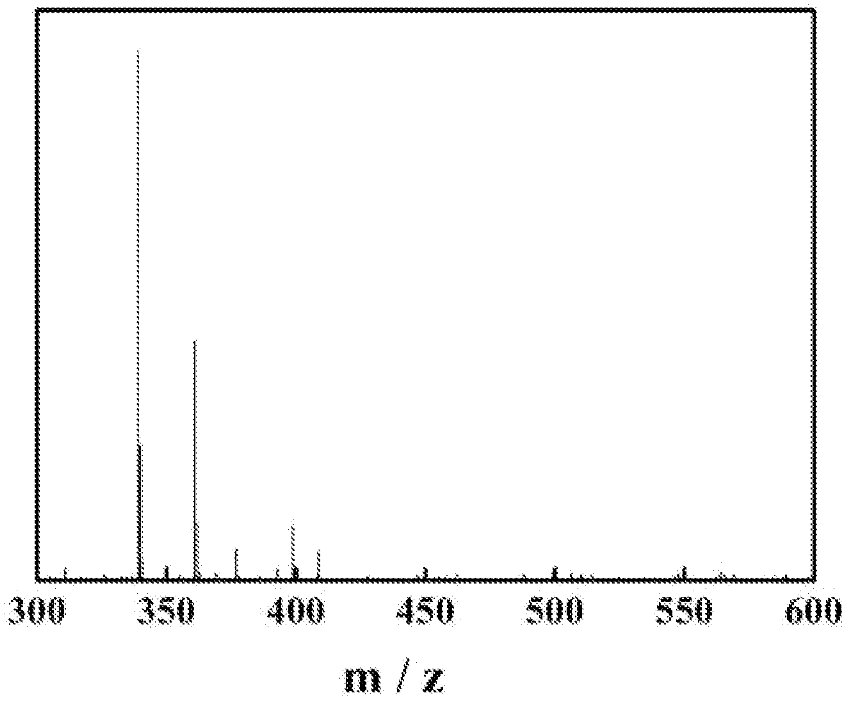
FIG. 2 shows a mass spectrum analysis graph of a plant biomass-based active tanning agent in Example 1, where a plant biomass used is gallic acid.

FIG. 2 shows a mass spectrum analysis graph of the plant biomass-based active tanning agent in Example 1. It is seen from FIG. 2 that the molecular weight of the tanning agent measured on a mass spectrometer (m/z: 338.9) is consistent with the accurate molecular weight thereof according to the chemical structural formula ($C_{10}H_4Cl_2N_3O_5Na$). This further demonstrates that the plant biomass-based active tanning agent was successfully synthesized by the method of the present disclosure.

Example 2

0.3 mol of cyanuric chloride was weighed accurately into a reaction flask charged with an appropriate amount of distilled water, an appropriate amount of an emulsifier was added dropwise, and a reaction temperature was controlled at 5° C.; a 0.1 mol alkaline solution of ellagic acid was added dropwise, an alkali solution was added dropwise simultaneously to control a reaction pH of 7.0, and then a reaction was conducted for 4.0 h under ultrasonic treatment; the reactants were left to stand overnight at a low temperature to obtain a light brown emulsion, namely a plant biomass-based active tanning agent.

Example 3

0.2 mol of cyanuric chloride was weighed accurately into a reaction flask charged with an appropriate amount of distilled water, an appropriate amount of an emulsifier was added dropwise, and a reaction temperature was controlled at 0° C.; a 0.1 mol alkaline solution of tannic acid was added dropwise, an alkali solution was added dropwise simultaneously to control a reaction pH of 6.0, and then a reaction was conducted for 5.0 h under microwave irradiation; the reactants were left to stand overnight at a low temperature to obtain a light brown emulsion, namely a plant biomass-based active tanning agent.

Test Example 1: Particle Size Testing

A droplet of each emulsion obtained after reaction in Examples 1 to 3 was diluted to a concentration of 0.1 g/L with deionized water, and filtered through a 0.45 μm filter head to be injected into a sample cell. The hydrodynamic radius (Rh) and polydispersity index (PDI) of the plant biomass-based active tanning agent were determined at 25° C. on a nanoparticle size analyzer. The specific results are shown in Table 1.

Table 1 The average particle size, particle size distribution and polydispersity index of plant biomass-based active tanning agents in Examples 1 to 3.

TABLE 1

| Plant biomass-based active tanning agent | Average particle size | PDI | Particle size distribution | |
|---|---|---|---|---|
| Example 1 | about 95 nm | 0.4 | about 76 nm | |
| Example 2 | about 110 nm | 0.5 | about 25 nm | about 112 nm |
| Example 3 | about 409 nm | 0.6 | about 74 nm | about 454 nm |

It is seen from Table 1 that for the plant biomass-based active tanning agent prepared in Example 1, the average particle size and hydrodynamic radius (Rh) are about 95 nm and about 76 nm, respectively, only one peak appears, and the PDI is about 0.4, falling within the moderate dispersion range; for the plant biomass-based active tanning agents prepared in Examples 2 and 3, the average particle sizes increase to about 110 nm and about 409 nm, respectively, two peaks appear, and the corresponding hydrodynamic radiuses (Rh) are about 25 nm and about 112 nm (PDI: 0.5), about 74 nm and about 454 nm (PDI: 0.6), respectively. Thus, it may be seen that the particle sizes of the plant biomass-based active tanning agents prepared in Examples 1 to 3 in aqueous solutions are all less than or equal to 500 nm, indicating a desirable permeability and dispersion stability during tanning for leathers.

Test Example 2: Tanning Performance Testing

The bated pelts were tanned directly with the plant biomass-based active tanning agents prepared in Examples 1 to 3 without pickling. The specific tanning process was as follows: the materials used during tanning were based on the weight of a limed hide, the liquor ratio (water weight/hide weight) was controlled at 0.7, and the temperature in drum was room temperature (25° C.); a bated hide was treated with 10% of plant biomass-based active tanning agent directly; after running for 2 h, during which the plant biomass-based active tanning agent was completely penetrated into leather, 50% of hot water (water temperature: 60° C.) was added in twice, and the drum was run at 40° C. for 2 h and at 45° C. for 4 h, respectively, so as to promote the binding of the plant biomass-based active tanning agent to collagen; finally, the hide was left to stand overnight, washed with water for 30 min next day, then taken out of the drum and horse-stacked.

Shrinkage temperature testing: the shrinkage temperatures (Ts) of the bated hide and the leathers tanned with the plant biomass-based active tanning agents were measured on a shrinkage temperature tester. Specifically, a sample (10 mm×60 mm) was suspended vertically in distilled water and heated at a heating rate of 2° C./min, and the temperature at which the sample shrank was recorded as Ts of the crust leather. Specific results are shown in Table 2.

Table 2 The shrinkage temperature of leathers tanned with the plant biomass-based active tanning agents in Examples 1 to 3.

TABLE 2

| Sample | Bated hide | Example 1 | Example 2 | Example 3 |
|---|---|---|---|---|
| Shrinkage temperature/° C. | 58 | 77 | 74 | 78 |

It is seen from Table 2 that by applying the plant biomass-based active tanning agents in Examples 1 to 3 to leather tanning, the crust leathers obtained have shrinkage temperatures up to 74-78° C., which are significantly higher than that of the bated hide (about 58° C.), indicating that the plant biomass-based active tanning agents may endow the leathers with desirable hydrothermal stability.

The description above is merely the preferred embodiments of the present disclosure. It should be noted that a person of ordinary skill in the art may further make several improvements and modifications without departing from the principle of the present disclosure, and such improvements and modifications should be deemed as falling within the protection scope of the present disclosure.

What is claimed is:

1. A method for preparing a plant biomass-based active tanning agent, comprising:

weighing a predetermined amount of cyanuric trichloride and distilled water into a reaction flask, and adding dropwise an appropriate amount of an emulsifier for uniform dispersion under a low-temperature reaction condition at a temperature of 0° C. to 5° C.;

subsequently, adding dropwise an aqueous plant biomass compound solution, wherein a molar ratio of cyanuric trichloride to the plant biomass compound in the aqueous plant biomass compound solution is within a range of (1.0-3.0):1 and wherein the plant biomass compound is one selected from the group consisting of gallic acid, ellagic acid, aloneaic acid, catechin, proanthocyanidins and tannic acid;

simultaneously, adding dropwise an alkali solution to control a reaction pH to be within a range of 4.0-8.0; and after adding dropwise, conducting nucleophilic substitution reaction for 4-8 h; then leaving a resulting mixture to stand overnight at a temperature of 0° C. to 5° C. to obtain a white or brown emulsion of the plant biomass-based active tanning agent.

2. The method according to claim 1, wherein the emulsifier is one or more selected from the group consisting of polyoxyethylene octylphenol ether-10, polyoxyethylene sorbitan monooleate, sorbitan fatty acid ester and fatty alcohol polyoxyethylene ether.

3. The method according to claim 1, wherein the low-temperature reaction condition is one selected from the group consisting of low-temperature mechanical stirring, low-temperature ultrasonic treatment and low-temperature microwave irradiation.

4. A plant biomass-based active tanning agent prepared by the method according to claim 1.

* * * * *